(12) United States Patent
Adams et al.

(10) Patent No.: US 9,394,442 B2
(45) Date of Patent: Jul. 19, 2016

(54) HYBRID THERMOPLASTIC GELS AND THEIR METHODS OF MAKING

(71) Applicant: Tyco Electronics Corporation, Berwyn, PA (US)

(72) Inventors: Gary W. Adams, Holly Springs, NC (US); William B. Bryan, Fuquay-Varina, NC (US)

(73) Assignee: CommScope Technologies LLC, Hickory, NC (US)

( * ) Notice: Subject to any disclaimer, the term of this patent is extended or adjusted under 35 U.S.C. 154(b) by 149 days.

(21) Appl. No.: 14/205,993

(22) Filed: Mar. 12, 2014

(65) Prior Publication Data
US 2014/0314381 A1    Oct. 23, 2014

Related U.S. Application Data

(60) Provisional application No. 61/777,705, filed on Mar. 12, 2013.

(51) Int. Cl.
| | |
|---|---|
| G02B 6/44 | (2006.01) |
| C08L 83/04 | (2006.01) |
| C08F 287/00 | (2006.01) |
| G02B 6/38 | (2006.01) |
| C08G 77/20 | (2006.01) |
| C08G 77/442 | (2006.01) |

(52) U.S. Cl.
CPC .............. *C08L 83/04* (2013.01); *C08F 287/00* (2013.01); *G02B 6/4444* (2013.01); *C08G 77/20* (2013.01); *C08G 77/442* (2013.01); *G02B 6/3887* (2013.01); *G02B 6/4494* (2013.01)

(58) Field of Classification Search
None
See application file for complete search history.

(56) References Cited

U.S. PATENT DOCUMENTS

| | | |
|---|---|---|
| 4,425,017 A | 1/1984 | Chan |
| 4,600,804 A | 7/1986 | Howard |
| 4,610,738 A | 9/1986 | Jervis |
| 4,643,924 A | 2/1987 | Uken et al. |
| 4,662,692 A | 5/1987 | Uken et al. |
| 4,741,709 A | 5/1988 | Jervis |
| 4,852,646 A | 8/1989 | Dittmer et al. |
| 4,883,431 A | 11/1989 | Uken et al. |

(Continued)

FOREIGN PATENT DOCUMENTS

| | | |
|---|---|---|
| EP | 0 879 832 A1 | 11/1998 |
| EP | 0 880 212 A2 | 11/1998 |

OTHER PUBLICATIONS

International Search Report and Written Opinion for PCT/US2014/024869 mailed Jul. 24, 2014.

(Continued)

*Primary Examiner* — Jerry Rahll
(74) *Attorney, Agent, or Firm* — Merchant & Gould P.C.

(57) ABSTRACT

Methods, compositions, and systems are provided for a hybrid thermoplastic gel or sealant. The methods comprise providing (a) a styrenic block copolymer, (b) a Si-vinyl polymer, (c) heat, and optionally (d) an initiator, and reacting the styrenic block copolymer, Si-vinyl polymer, and optional initiator in the presence of the heat to form the hybrid thermoplastic gel. The gel composition may comprise 5-70 wt. % of a styrenic block copolymer, 60-95 wt. % of a Si-vinyl polymer, and 0-10 wt. % of an initiator. A closure or interconnect system may comprise a housing, a cable, and a hybrid thermoplastic gel made by reacting a styrenic block copolymer and a Si-vinyl polymer in the presence of heat.

21 Claims, 9 Drawing Sheets

(56) References Cited

U.S. PATENT DOCUMENTS

| | | |
|---|---|---|
| 4,942,270 A | 7/1990 | Gamarra |
| 5,149,736 A | 9/1992 | Gamarra |
| 5,246,383 A | 9/1993 | Shimirak et al. |
| 5,313,019 A | 5/1994 | Brusselmans et al. |
| 5,347,084 A | 9/1994 | Roney et al. |
| 5,376,019 A | 12/1994 | Shimirak et al. |
| 5,441,560 A | 8/1995 | Chiotis et al. |
| 5,442,004 A | 8/1995 | Sutherland et al. |
| 5,562,491 A | 10/1996 | Shimirak et al. |
| 5,601,460 A | 2/1997 | Shimirak et al. |
| 5,665,809 A | 9/1997 | Wójtowicz |
| 5,828,005 A | 10/1998 | Huynh-Ba et al. |
| 6,132,867 A | 10/2000 | Hammond et al. |
| 6,235,801 B1 | 5/2001 | Morales et al. |
| 6,475,029 B2 | 11/2002 | Tucker et al. |
| 6,475,329 B1 | 11/2002 | Johnson et al. |
| 6,486,237 B1 | 11/2002 | Howe et al. |
| 6,494,464 B1 | 12/2002 | Chandler et al. |
| 6,848,949 B2 | 2/2005 | Mullaney et al. |
| 6,875,496 B2 | 4/2005 | Roosen et al. |
| 6,971,897 B1 | 12/2005 | Beavers et al. |
| 7,060,747 B2 | 6/2006 | Matayabas, Jr. |
| 7,780,173 B2 | 8/2010 | Mullaney et al. |
| 8,227,696 B2 | 7/2012 | Pullium, III et al. |
| 8,404,172 B2 | 3/2013 | Ellsworth et al. |
| 8,642,891 B2 | 2/2014 | Berghmans et al. |
| 8,687,934 B2 | 4/2014 | Wright et al. |
| 8,691,884 B2 | 4/2014 | Ellsworth et al. |
| 2006/0202434 A1 | 9/2006 | Willems et al. |
| 2009/0103877 A1 | 4/2009 | Kluwe et al. |
| 2009/0186958 A1 | 7/2009 | St. Clair |
| 2009/0304341 A1 | 12/2009 | Shimirak et al. |
| 2012/0097414 A1 | 4/2012 | O'Sullivan et al. |
| 2012/0101204 A1 | 4/2012 | Adams |
| 2012/0130011 A1 | 5/2012 | Ellsworth et al. |
| 2012/0235363 A1 | 9/2012 | Vanhentwnrijk et al. |
| 2012/0322942 A1 | 12/2012 | Berghmans et al. |
| 2013/0005842 A1 | 1/2013 | Evans et al. |
| 2013/0020771 A1 | 1/2013 | Vanhentenrijk et al. |
| 2013/0294739 A1 | 11/2013 | Allen et al. |
| 2014/0041893 A1 | 2/2014 | Adams et al. |

OTHER PUBLICATIONS

Naga, N. et al., "Synthesis of Organic-Inorganic Hybrid Gels from Siloxane or Silsesquioxane and $\alpha,\omega$-Nonconjugated Dienes by Means of a Photo Hydrosilylation Reaction," *Macromolecules,* vol. 42, No. 10, pp. 3454-3462 (2009).

HYBRID THERMOPLASTIC GELS AND THEIR METHODS OF MAKING

CROSS-REFERENCE TO RELATED APPLICATION

The present application claims the benefit of U.S. Provisional Patent Application Ser. No. 61/777,705, filed Mar. 12, 2013, which application is hereby incorporated by reference in its entirety.

BACKGROUND

In today's modern electrical and electronic devices, as well as in other uses such as fiber optic connections, sealants are often used for insulation, for protection against water, corrosion and environmental degradation, optical index matching, and thermal management. Prior to now, a number of sealants including gels have been known, however, processing gels in a cost effective, efficient, and effective manner has been a challenge.

As technology progresses, sealants will be subjected to increasingly higher temperature environments and more demanding performance requirements. There has been, and there presently exists, a need for high performance sealants to meet these demands. For example, there is an increasing need for high service gel sealants for use in outdoor energy transmission applications and for use near engine compartments.

In particular, closure systems are used to protect internal components from degradation caused by external environments. For example, internal components such as fiber optic cables and copper cables are often enclosed in closure systems. Examples of commercially available closure systems include the Outdoor Fiber Drop Repair (OFDR), the Outdoor Fiber Distribution Closure (OFDC), and the Fiber optic Infrastructure System Technology (FIST), available from Tyco Electronics, Kessel-Lo, Belgium. In particular, the OFDR Closure is used to break out fibers from a looped fiber optic cable to connect users such as business customers or persons in multiple or single living units. These types of closures can be used in aerial, pedestal, and underground environments. Other closure systems are commercially available for use with communication and energy transmission cables.

Closure systems typically include internal components such as fiber organizers, cable seals and termination devices, drop cable seals for a number of drops with drop cable termination devices, and universal splice holders for a number of splices. These internal components may be subject to environmental factors such as varying moisture levels, heat and cold, and exposure to other chemical substances. The closure systems are preferably protected from damage with a sealant of some sort. Conventional sealants, however, suffer from a number of drawbacks that make them unsuitable for certain closure systems.

Sealants are often used for insulation and for protection against water, corrosion and environmental degradation, and for thermal management. Prior to now, a number of sealants have been known; however, currently available sealants have certain drawbacks and disadvantages that make them inadequate for specific uses and for use in contact with certain materials. In particular, there is an unmet need for sealants that are suitable for fiber optic and electronic closure systems.

Suitable sealing systems for closures are needed for use with a variety of different cables. For examples, a sealing system is needed for cables termed Low Smoke Zero Halogen ("LSZH"), also known as Low Smoke Halogen Free ("LSHF"), Low Smoke Zero Halogen ("LS0H"), and Zero Halogen Low Smoke ("0HLS") among other things.

LSZH cables are characterized by containing no halogenated flame-retardants, and produce relatively limited amounts of smoke when exposed to sources of heat such as a flame or heated wires. LSZH cables provide an alternative to the frequently used polyethylene, PVC, or thermoplastic urethane coatings. Polyethylene, PVC, or thermoplastic urethane, when they contain halogens, may produce hazardous halogen-containing compounds such as HCl or HBr gas. An improvement to current LSZH cable closure systems is needed to enhance performance in environmentally sensitive environments.

Traditionally, thermoplastic elastomer gels (TPEGs) have been used as sealants in certain applications, including LSZH closure systems, due to their unique properties. TPEGs have provided many years of reliable in-field performance for applications requiring a low maximum service temperature of approximately 70° C. TPEGs may comprise a styrene ethylene/butylene styrene ("SEBS") triblock copolymer swollen with a mineral oil softener. While the thermoplastic nature of these gels allows for easy production, it limits the upper service temperature due to creep and flow as in-field ambient temperatures approach the styrene glass transition. Research has been aimed at increasing the upper service temperature of these gels through chemically crosslinking the gel network in order to form a thermoset gel structure. For example, oil-swelled acid/anhydride modified maleic anhydride SEBS gels have been covalently crosslinked using small molecule crosslinkers like di- and triamines, EP 0879832A1, as well as with some metal salts, D. J. St. Clair, "Temp Service," Adhesives Age, pp. 31-40, September 2001. Crosslinked polymers are known to increase thermal stability, toughness, and chemical resistance compared to their base, or uncrosslinked polymers. However, crosslinked polymers are also known to often be intractable, making them difficult to reprocess or recycle.

A problem, however, with thermoplastic gels used as sealants, and in closure systems in general, is that they often contain high amounts of mineral oil. Under long term aging conditions of heat, pressure, and environmental exposure, a small amount of the mineral oil is able to diffuse out of the gel. One observed problem is that certain flexibilizers added to the cable jacket formulation, such as ethylene vinyl acetate (EVA), may bond to the mineral oil and cause the jacket cable of the closure system to lose its tensile strength or degrade, making the closure susceptible to leaking oil. The oil in these gels may diffuse out from the gel and cause deterioration, discoloring, or degradation of the cable in the closure system as well. In some extreme cases, a cable may even fracture or split under compression due to the damage done by contact with the oil in the thermoplastic gel. Accordingly there exists an unmet need for gels, sealants, and closure systems with improved/suitable thermal stability, flame retardance, damping characteristics, hardness, viscoelastic properties, low permanent set or compression set, long-term performance (e.g., >20 years), amongst other properties, including compatibility with EVA and LSZH cables.

SUMMARY

In one embodiment, a method of making a hybrid thermoplastic gel comprises providing a styrenic block copolymer and a Si-vinyl polymer. The method further comprises providing heat. The method further comprises reacting the styrenic block copolymer and Si-vinyl polymer in the presence of the heat to form a hybrid thermoplastic gel. In some embodiments, the method further comprises providing an initiator to facilitate the reacting of the styrenic block copolymer and the Si-vinyl polymer. The initiator may be selected from the group consisting of: peroxides, azobisisobutyronitrile, addition cure compositions, condensation cure compositions, and combinations thereof. In one embodiment, the initiator is a peroxide. In another embodiment, the peroxide is dicumyl peroxide.

In certain embodiments, the method further comprises providing at least one additive selected from the group consisting of: flame retardants, coloring agents, adhesion promoters, antioxidants, synergistic antioxidant antiozonant mixtures, stabilizers, clays or other reinforcing particulate fillers, dispersants, flow improvers, rubber particles, silanes, acid scavengers, plasticizers, slip agents, toughening agents, and combinations thereof.

In certain embodiments, the styrenic block copolymer is a copolymer selected from the group consisting of: styrene-isoprene-styrene, styrene-ethylene/butylene-styrene, styrene-ethylene/propylene-styrene, or styrene butadiene styrene. In one embodiment, the styrenic block copolymer is a styrene-isoprene-styrene copolymer. In some embodiments, the Si-vinyl polymer is vinyl terminated polydimethylsiloxane.

In certain embodiments, the gel comprises one or more of the following properties: a) a hardness between 80 g and 300 g; b) a stress relaxation between 20% and 65% when the gel is subjected to a deformation of 50% of its original size; c) a compression set between 4% and 20% after 50% strain has applied to the gel for 1000 hours at 70° C.; and d) less than 10% oligomeric extender bleed out after being under compression of 1.2 atm for 60 days at 60° C.

In another embodiment, a hybrid thermoplastic gel composition comprises 5-70 wt. % of a styrenic block copolymer, 30-95 wt. % of a Si-vinyl polymer; and 0-10 wt. % of an initiator. The some embodiments, the gel comprises 20-55 wt. % of a styrenic block copolymer; 45-80 wt. % of a Si-vinyl polymer; and 0.01-5 wt. % of an initiator. In other embodiments, the gel comprises 35-50 wt. % of a styrenic block copolymer; 50-65 wt. % of a Si-vinyl polymer; and 0.1-3 wt. % of an initiator.

In certain embodiments, the gel comprises 0.01-10 wt. % of the initiator, and the initiator is selected from the group consisting of: peroxides, azobisisobutyronitrile, addition cure compositions, condensation cure compositions, and combinations thereof. In one embodiment, the initiator is a peroxide. In another embodiment, the peroxide is dicumyl peroxide.

In other embodiments, the gel further comprises at least one additive selected from the group consisting of: flame retardants, coloring agents, adhesion promoters, antioxidants, synergistic antioxidant antiozonant mixtures, stabilizers, clays or other reinforcing particulate fillers, dispersants, flow improvers, rubber particles, silanes, acid scavengers, plasticizers, slip agents, toughening agents, and combinations thereof.

In some embodiments, the styrenic block copolymer is a copolymer selected from the group consisting of: styrene-isoprene-styrene, styrene-ethylene/butylene-styrene, styrene-ethylene/propylene-styrene, or styrene butadiene styrene. In one embodiment, the styrenic block copolymer is a styrene-isoprene-styrene copolymer. In another embodiment, the Si-vinyl polymer is vinyl terminated polydimethylsiloxane.

In some embodiments, the gel comprises one or more of the following properties: a) a hardness between 80 g and 300 g; b) a stress relaxation between 20% and 65% when the gel is subjected to a deformation of 50% of its original size; c) a compression set between 4% and 20% after 50% strain has applied to the gel for 1000 hours at 70° C.; and d) less than 10% oligomeric extender bleed out after being under compression of 1.2 atm for 60 days at 60° C.

In another embodiment, a closure or interconnect system comprises a housing, a cable, and a hybrid thermoplastic gel made by reacting a styrenic block copolymer and a Si-vinyl polymer in the presence of heat. In some embodiments, the system further comprises a gel also comprising an initiator to facilitate the reacting of the styrenic block copolymer and the Si-vinyl polymer. In certain embodiments, the gel in the system is compatible with a LSZH cable as determined by a pressure loss test or tightness test following at least one of the following mechanical or environmental tests: axial tension test, flexure test, re-entry test, torsion test, resistance to aggressive media test, resistance to stress cracking test, salt fog test, temperature cycling test, and waterhead test.

In certain embodiments, the system further comprises a connector and a receptacle for the connector. In some embodiments, the gel in the system has less than 10% extender bleed out after being under compression of 1.2 atm for 60 days at 60° C. In other embodiments, the gel in the system has less than 5% extender bleed out after being under compression of 1.2 atm for 60 days at 60° C.

DETAILED DESCRIPTION

Figure 1:
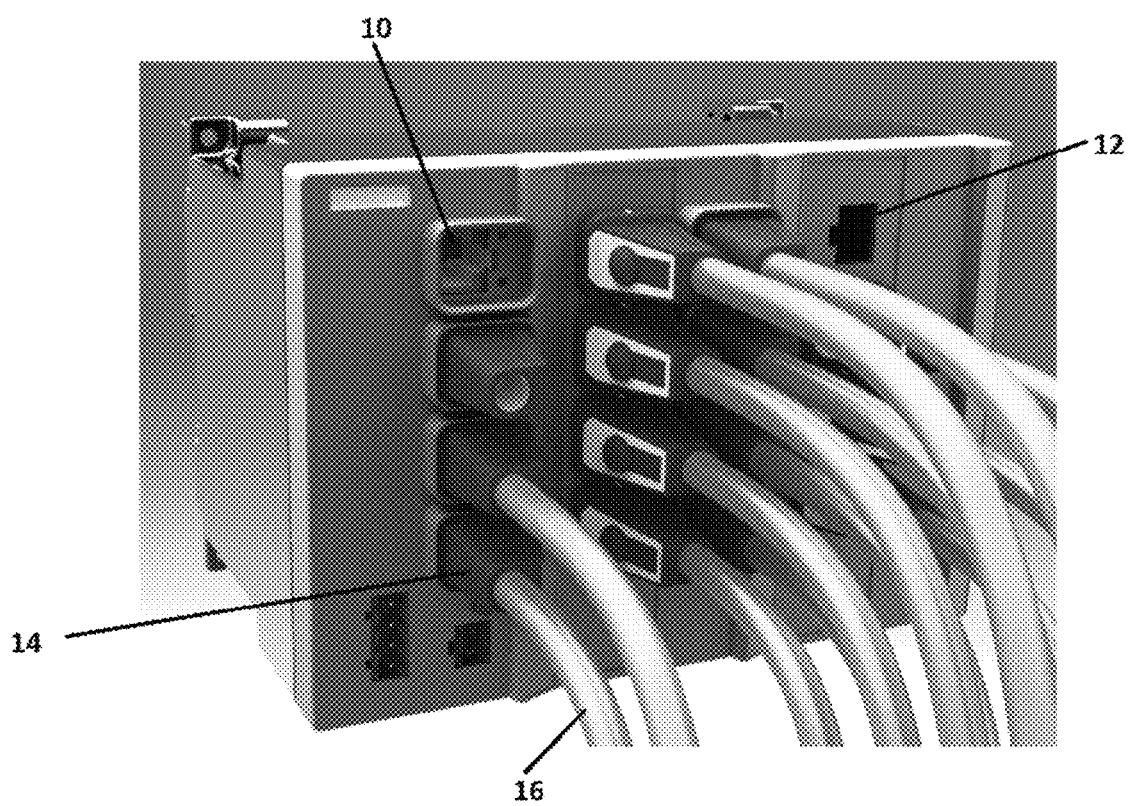
FIG. 1 is a depiction of an interconnect system having a connection hub having multiple connection ports or receptacles for the connector, housing, and cable components to be connected.

As used herein, terms such as "typically" are not intended to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

As used herein, the terms "comprise(s)," "include(s)," "having," "has," "contain(s)," and variants thereof, are intended to be open-ended transitional phrases, terms, or words that do not preclude the possibility of additional acts or structure.

As used herein, the term "polymer" may refer to a polymeric compound prepared by polymerizing monomers, whether of the same or a different type. The generic term "polymer" embraces the terms "homopolymer," "copolymer," and the like.

Any concentration range, percentage range, or ratio range recited herein are to be understood to include concentrations, percentages, or ratios of any integer within that range and fractions thereof, such as one tenth and one hundredth of an integer, unless otherwise indicated. Also, any number range recited herein relating to any physical feature are to be understood to include any integer within the recited range, unless otherwise indicated. It should be understood that the terms "a" and "an" as used above and elsewhere herein refer to "one or more" of the enumerated components. For example, "a" polymer refers to one polymer or a mixture comprising two or more polymers.

Making the Hybrid Thermoplastic Gel

In certain embodiments, the hybrid thermoplastic gel is made through the mixture and reaction of a styrenic block copolymer with a Si-vinyl polymer in the presence of heat (i.e., wherein the reaction is conducted at an elevated temperature greater than 25° C.). In some embodiments, no catalyst or initiator is needed other than heat to react the styrenic block copolymer with the Si-vinyl polymer. In other embodiments, the gel further comprises the addition of an initiator (e.g., a peroxide such as dicumyl peroxide) to facilitate the reaction and crosslinking of the styrenic block copolymer and Si-vinyl polymer, wherein the gel is made through the reaction of the styrenic block copolymer, Si-vinyl polymer, and initiator in the presence of heat.

The styrenic block copolymer and Si-vinyl polymer components may be combined using a batch process of melting the materials together but minimizing the amount of chemical reaction in the batch process. Through this process, the end composition may have modest tear strength, gel-like properties, and elasticity. The initiator may be added to the gel by introducing it prior to a static mix tube using a metering pump or injection cylinder. The gel composition formed may having sufficient "green" strength to remove from the mold quickly, keeping the cycle time low, and allow for post-curing through a variety of methods depending on the crosslink chemistry used.

The initiator or catalyst may "lightly" crosslink the Si-vinyl polymer and/or graft the Si-vinyl polymer onto the styrenic block copolymer (e.g., the crosslinking can be controlled). There are several advantages to this approach compared with batch manufacture of a hybrid gel or a 100% silicone gel, as the amount of crosslinking and chemical reaction can be carefully controlled by concentration of reactant stream and temperature. The system can be set up and started without the reactant stream so that any scrap that is made can be recycled until the molding conditions are optimized. Existing molds can be used and the system can be adapted to current production gel molding equipment. The Si-vinyl and styrenic block hybrid polymer blend can be made using conventional compounding equipment, stored, melted, and converted to gel as needed. Additionally, the Si-vinyl and styrenic block hybrid polymer combination will be lower in materials cost than a similar 100% silicone system.

In certain embodiments, the hybrid thermoplastic gel is made absent a significant amount of an "extender oil" (e.g., less than 1 wt. %, less than 0.1 wt. %, or less than 0.01 wt. %). The extender oil may refer to a compound having a terminal olefin or functional site (e.g., polyisobutylene or maleated polyisobutylene) that is capable of forming a connection and "extending" the styrenic block copolymer or Si-vinyl polymer.

In certain embodiments, the hybrid thermoplastic gel comprises and is prepared by mixing between 5-70 wt. % styrenic block copolymer with 30-95 wt. % Si-vinyl polymer. In another embodiment, the gel comprises and is prepared by mixing 20-55 wt. % styrenic block copolymer with 45-80 wt. % Si-vinyl polymer. In yet another embodiment, the gel comprises and is prepared by mixing 35-50 wt. % styrenic block copolymer with 50-65 wt. % Si-vinyl polymer.

In certain embodiments, the hybrid thermoplastic gel comprises and is prepared by mixing between 5-70 wt. % styrenic block copolymer, 30-95 wt. % Si-vinyl polymer, and 0-10 wt. % initiator (e.g., a peroxide such as dicumyl peroxide). In some embodiments, the gel comprises and is prepared by mixing between 5-70 wt. % styrenic block copolymer, 30-95 wt. % Si-vinyl polymer, and 0.01-10 wt. % initiator. In other embodiments, the gel comprises and is prepared by mixing 20-55 wt. % styrenic block copolymer, 45-80 wt. % Si-vinyl polymer, and 0.01-5 wt. % initiator. In yet other embodiments, the gel comprises and is prepared by mixing 35-50 wt. % styrenic block copolymer, 50-65 wt. % Si-vinyl polymer, and 0.1-3.5 wt. % initiator.

In certain embodiments, the gel components are mixed together at an elevated temperature (i.e., greater than room temperature) for a certain period of time. The temperature and time at temperature may be adjusted accordingly to target the end properties desired in the gel. Several of those properties are discussed in the section below labeled "Uses and Properties of the Hybrid Thermoplastic Gel." In certain embodiments, the mixing and reacting is conducted at an elevated temperature between 100-250° C., 150-220° C., or 170-200° C. In some embodiments, the mixing at the elevated temperature is held for 10 minutes-12 hours, 30 minutes-8 hours, or 1-6 hours.

In certain embodiments, one or more additives may also be added to the gel composition. In certain embodiments, the one or more additives may comprise between 0.1-30 wt. % of the overall composition, 1-25 wt. % of the overall gel composition, or 5-20 wt. % of the overall composition. In particular, the gel may include a stabilizer comprising between 0.1-5 wt. %, 0.5-3 wt. %, or 1-2 wt. % of the overall gel composition.

In some embodiments, the styrenic block copolymer and/or Si-vinyl polymer are maleated prior to the mixing discussed above. The maleated reaction of the styrenic block copolymer and/or silicone-vinyl polymer is discussed in greater detail below.

Styrenic Block Copolymer

In certain embodiments, the styrenic block copolymer is a styrene-isoprene-styrene ("SIS"), styrene-ethylene/butylene-styrene ("SEBS"), styrene-ethylene/propylene-styrene ("SEPS") copolymer, or styrene butadiene styrene ("SBS") copolymer. In one particular example, the styrenic block copolymer is a SIS copolymer. In another particular example, the styrenic block copolymer is a SBS copolymer. Other examples of styrenic block copolymer are described in U.S. Patent Application No. 2012/0130011, herein incorporated by reference in its entirety.

In certain particular examples, the styrenic block copolymer may be any such configured polymers such as those available from Kraton Polymers (Houston, Tex., USA), including but not limited to: Kraton styrenic block copolymer D1119P, MD6684, RP6684, FG190, FG1924, RP6670, 1901, 1901X, B 51-4, FG 120LX, FG 1652, FG 19, FG 1900X, FG 1901, FG 1901X, FG 1901X951, FG 1921X, FG 1924, FG 1924X, FG 1961X, G 1901, G 1901X, G 1901X2, G 1921, GRP 6627, KG 1901, M 1923, MB 1000, RP 6509, RP 6510, RP 6543, RP 6562. In some embodiments, the styrenic block copolymer may be at least one of the following available from Asahi Kasei Elastomer (Tokyo, Japan): Asahi M 1913, M 1943, and M 1953.

In other embodiments, the styrenic block copolymer comprises at least one of the following commercially available copolymers, including hydrogenated styrenic block copolymers such as the polystyrene-poly(ethylene-propylene) diblock copolymers available from Kraton Polymers as KRATON G1701 and G1702; the polystyrene-poly(ethylene-butylene)-polystyrene triblock copolymers available from Kraton Polymers as KRATON G1641, G1650, G1651, G1654, G1657, G1726, G4609, G4610, GRP-6598, RP-6924, MD-6932M, MD-6933, and MD-6939; the polystyrene-poly(ethylene-butylene-styrene)-polystyrene (S-EB/S-S) triblock copolymers available from Kraton Polymers as KRATON RP-6935 and RP-6936; the polystyrene-poly(ethylene-propylene)-polystyrene triblock copolymers available from Kraton Polymers as KRATON G1730; the polystyrene-poly(ethylene-butylene)-polystyrene triblock copolymer comprising 67 wt. % polystyrene available from Asahi Kasei Elastomer as TUFTEC H1043; the polystyrene-poly(ethylene-butylene)-polystyrene triblock copolymer comprising 42 weight percent polystyrene available from Asahi Kasei Elastomer as TUFTEC H1051; the polystyrene-poly(butadiene-butylene)-polystyrene triblock copolymers available from Asahi Kasei Elastomer as TUFTEC P1000 and 2000; the polystyrene-polybutadiene-poly(styrene-butadiene)-polybutadiene block copolymer available from Asahi Kasei Elastomer as S.O.E.-SS L601; the polystyrene-poly(ethylene-butylene)-polystyrene triblock copolymer comprising about 60 wt. % polystyrene available from Kuraray as SEPTON S8104; the polystyrene-poly(ethylene-ethylene/propylene)-polystyrene triblock copolymers available from Kuraray as SEPTON® S4044, S4055, S4077, and S4099; and the polystyrene-poly(ethylene-propylene)-polystyrene triblock copolymer comprising about 65 wt. % polystyrene available from Kuraray as SEPTON® S2104. Mixtures of two or more block copolymers may be used. Illustrative commercially available unhydrogenated block copolymers include the Kraton D series polymers, including KRATON D1101 and D1102, from Kraton Polymers, and the styrene-butadiene radial teleblock copolymers available as, for example, K-RESIN KR01, KR03, KR05, and KR10 sold by Chevron Phillips Chemical Company. In another embodiment, the styrenic block copolymer is a mixture of high melt viscosity SEBS block copolymer and a functionalized SEBS block copolymer.

In another embodiment, the styrenic block copolymer comprises maleic anhydride grafted to the block copolymer. The maleated functional groups are examples of functional groups configured for crosslinking during gel processing. For further example, the maleated functional groups of a maleic anhydride-modified SEBS or SEPS are configured for crosslinking Not wishing to bound by theory, but it is believed that chemical crosslinking of the SEBS or SEPS triblocks at the ethylene-butylene or ethylene-propylene blocks may further strengthen the gel structure. The chemical crosslinking produced is capable of raising its softening temperature.

Methods of preparing maleated block copolymers are known in the art and many such block copolymers are commercially available. For example, maleated block copolymers are disclosed in EP 0879832A1. Illustrative commercially available maleic anhydride-modified SEBS are available from Kraton Polymers (Houston, Tex., USA) as KRATON FG1901 (SEBS polymer having a polystyrene content of about 30 wt. % and maleic anhydride grafted content of about 1.4-2.0 wt. %) and KRATON FG 1924 G (SEBS polymer with about 13 wt. % polystyrene and maleic anhydride grafted content of about 0.7-1.3 wt. %), and KRATON MD 6684 CS (SEBS polymer having a polystyrene content of about 30 wt. % and maleation level of about 1.0 wt. %), and KRATON MD 6670. Illustrative commercially available maleic anhydride-modified SEBS are available from Asahi Chemical Industry Co., Ltd. (Tokyo, Japan) under the trade name M-1911 (maleation level of about 3.0 wt. %), M-1913 (maleation level of about 2.0 wt. %), and M-1943.

In one embodiment, the maleic anhydride modified SEBS is KRATON MD6684CS. In another embodiment, the maleic anhydride-modified SEBS is KRATON FG6684. In yet another embodiment, the maleic anhydride modified SEBS is selected from the group consisting of as KRATON FG1901, KRATON FG 1924 G, KRATON MD 6684 CS, and KRATON MD 6670. In another embodiment, the maleic anhydride-modified SEBS has a maleation level of between 1.0 wt. % and 3.0 wt. %.

Si-Vinyl Polymer

In certain embodiments, the hybrid thermoplastic gel includes a Si-vinyl polymer that is capable of crosslinking with the styrenic block copolymer to "extend" the length of the styrenic block copolymer. In certain embodiments, the Si-vinyl polymer is a vinyl terminated polydimethylsiloxane (otherwise referred to as "V-PDMS"), such as shown below in (I). In this example, the Si-vinyl polymer compound comprises a vinyl group at each end of the compound.

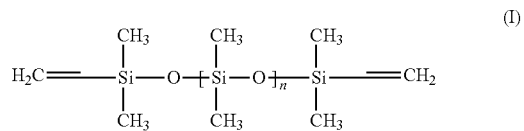

In certain embodiments, the molecular weight of the Si-vinyl polymer is controlled through anionic ring-opening polymerization of cyclic siloxanes in the presence of alkali-metal hydroxide of a base that is volatile (e.g., tetramethylammonium silanolate). Endcapping of the PDMS with a vinyl group is needed, so these groups are added to the polymerization mixture.

The vinyl-containing polymer, such as V-PDMS, may have different viscosities that affect the resulting hybrid thermoplastic gel. In general, a high molecular weight V-PDMS will produce an uncured gel with a higher viscosity. In certain embodiments, a low molecular weight V-PDMS generally improves processability. In other embodiments, the V-PDMS used in the hybrid thermoplastic gel has a viscosity between approximately 500 and 165,000 cSt (500-165,000 mm$^2$/s), between approximately 1000 cSt and 60,000 cSt (1000-60,000 mm$^2$/s), between approximately 3000 cSt and 7000 cSt (3000-7000 mm$^2$/s), or between approximately 4500 cSt and 5500 cSt (4500-5500 mm$^2$/s).

In some embodiments, the vinyl-terminated polydimethylsiloxane has a molecular weight between about 20,000 g/mol and about 50,000 g/mol. In other embodiments, the vinyl-terminated polydimethylsiloxane has a molecular weight between about 50,000 g/mol and about 80,000 g/mol. In yet other embodiments, the vinyl-terminated polydimethylsiloxane has a molecular weight between about 28,000 g/mol and about 72,000 g/mol. In one particular embodiment, the vinyl-terminated polydimethylsiloxane has a molecular weight of approximately 49,500 g/mol.

In certain embodiments, the Si-vinyl polymer contains between approximately 1 and 10 mol of vinyl per 500,000 g/mol of V-PDMS. In one embodiment, the Si-vinyl polymer contains approximately 2 mol of vinyl per 200,000 g/mol of V-PDMS (the vinyl end group concentration would be in the order of $10^{-5}$). In yet other embodiments, the vinyl content of the V-PDMS is between approximately 0.01 and 0.1 mmol/g, or between approximately 0.036 and 0.07 mmol/g.

In one particular embodiment, the Si-vinyl polymer is RTV 633 (available from Momentive Performance Materials, Columbus, Ohio, USA), which is a divinyl terminated polydimethyl siloxane with a viscosity of about 60,000-80,000 cSt (60,000-80,000 mm$^2$/s).

Initiators and Additives

In certain embodiments, the thermoplastic gel composition may comprise the addition of an initiator, which may assist in initiating a free radical reaction to crosslink the styrenic block copolymer with the Si-vinyl polymer. These initiators may be catalysts or reactant streams/compositions that can assist in lightly crosslinking the styrenic block copolymer with the Si-vinyl polymer. The initiator may be selected from the group consisting of peroxides (such as dibenzoyl peroxide and dicumyl peroxide), azobisisobutyronitrile, addition cure compositions (such as platinum catalyzed hydrosilation chain extenders and catalysts), condensation cure compositions (tin or tintanate catalyzed), and combinations thereof. In certain embodiments, the initiator is a peroxide. In one particular example, the peroxide is dicumyl peroxide (available from Arkema Inc., King of Prussia, Pa., USA).

Furthermore, the thermoplastic gel composition may comprise one or more additive components. For example, the gel composition may include additives such as flame retardants, coloring agents, adhesion promoters, antioxidants, synergistic antioxidant antiozonant mixtures, stabilizers, clays or other reinforcing particulant fillers, dispersants, flow improvers, rubber particles, silanes, acid scavengers, plasticizers, slip agents, toughening agents, and combinations thereof.

In some embodiments, the gel composition comprises a stearamide to aid in processing in the mixer and act as a mold release. The stearamide may be a saturated stearamide. In one particular example, the saturated stearamide is Proaid AC18S (commercially available from Akrochem Corp., Akron, Ohio, USA). Such compositions may be helpful or effective in reducing the surface tack of the formulation compared to other blocking agents such as oleamides or erucamides.

In certain embodiments, the gel composition comprises an antioxidant or stabilizer such as a hindered phenol (e.g., Irganox™ 1076, commercially available from Ciba-Geigy Corp., Tarrytown, N.Y., USA), phosphites (e.g., Irgafox™ 168, commercially available from Ciba-Geigy Corp.), metal deactivators (e.g., Irganox™ D1024, commercially available from Ciba-Geigy Corp.), sulfides (e.g., Cyanox LTDP, commercially available from American Cyanamid Co., Wayne, N.J., USA), light stabilizers (e.g., Cyasorb UV-531, commercially available from American Cyanamid Co.), phosphorous containing organic compounds (e.g., Fyrol PCF and Phosflex 390, both commercially available from Akzo Nobel Chemicals Inc. of Dobbs Ferry, N.Y., USA), and/or acid scavengers (e.g., DHT-4A, commercially available from Kyowa Chemical Industry Co. Ltd through Mitsui & Co. of Cleveland, Ohio, USA, and hydrotalcite). Other suitable additives include colorants, biocides, tackifiers, and the like.

In certain embodiments, the gel composition comprises a toughening agent that may improve the ability for the composition to deform without breaking. In some embodiments, the toughening agent may allow the composition to be strained to approximately 800%, 1000%, or 1200% of its original size before breaking.

In certain embodiments, the toughening agent is a fumed silica. In certain embodiments, the fumed silica comprises between 0.1-30 wt. % of the overall composition, 1-25 wt. % of the overall composition, or 5-20 wt. % of the overall composition. One non-limiting example of a fumed silica that may be used in the gel composition is AEROSIL® R9200 modified, hydrophobic fumed silica (commercially available from Evonik Degussa Corp., Parsippany, N.J., USA).

In certain embodiments, the additional additives may include at least one material selected from the group consisting of Dynasylan 40, PDM 1922, Songnox 1024, Kingnox 76, DHT-4A, Kingsorb, pigment, and mixtures thereof. In some embodiments, the additives comprise between 0.1 and 25 wt. % of the overall composition, between 0.1 and 5 wt. % of the overall composition, between 0.1 and 2 wt. % of the overall composition, or between 0.1 and 1 wt. % of the overall composition.

In some embodiments, the compositions disclosed and by methods disclosed herein comprise a flame retardant. In certain embodiments, the flame retardant is zinc oxide. In other embodiments, the flame retardant is a halogenated paraffin (e.g., Bromoklor 50, commercially available from Ferro Corp., Hammond, Ind., USA). In some embodiments, the flame retardant comprises between 0.1 and 25 wt. % of the overall composition, between 0.1 and 5 wt. % of the overall composition, between 0.1 and 2 wt. % of the overall composition, or between 0.1 and 1 wt. % of the overall composition. In one embodiment, the flame retardant comprises 20 wt. % of the overall gel composition.

In some embodiments, the compositions disclosed and made by methods disclosed herein contain at least one stabilizer. Stabilizers include antioxidants, acid-scavengers, light and UV absorbers/stabilizers, heat stabilizers, metal deactivators, free radical scavengers, carbon black, and antifungal agents.

Uses and Properties of the Hybrid Thermoplastic Gel, and Testing Methods

The gel compositions described herein have a number of potential end uses due to their improved properties, such as improved behavior in mechanical stresses (e.g., vibration and shock) or ability to seal uneven or complicated structures (due to the ability to flow and adapt to the area of the structure). In certain embodiments, the gel composition may be used as a thermoplastic elastomer with improved flame retardance and/or thermal stability in comparison to a 100% olefin based thermoplastic elastomer.

In other embodiments, the gel may be used in an interconnect, cover, or closure system. In particular, the gel may be used in a fiber optic closure, electrical sealant, or electrical closure. In some embodiments, the gels are used as gel wraps, clamshells, or gel caps. In further embodiments, the gels are used in the inside of a residence. In other embodiments, the gels are used outside of a residence. Use of the gel within a closure or interconnect system may allow for a reduction in the number of components, frame size, or cost over other sealing mechanisms.

With regards to use as a sealant, the hybrid gels described herein tend to exhibit a unique stress-strain dynamic, as further described below. With an increase in strain beyond the point of the elastic (linear) portion of the curve, the gel exhibits a somewhat exponential increase in stress prior to the failure point. In other words, the gel tends to become even stiffer with an increase in strain or pressure on the gel as it approaches its failure point. In certain examples, such as within a closure, the gel is stiff at the higher strain points near the ends of the closure, keeping the softer gel composition within the closure from extruding out of the closure.

In certain embodiments, the gel is used as a dampener, providing a high damping or viscous loss modulus. In certain embodiments, the gel is used as a flame retardant sealant. In one embodiment, the gel comprises a flame retardant additive (e.g., zinc oxide) in order to function as a flame retardant sealant.

In certain embodiments, the gel is used in a closure or enclosure system. In certain embodiments, the closure system comprises a housing, a cable, and a gel. In some embodiments, the cable is a LSZH cable.

In some embodiment, the system further comprises a connector, and, in some instances, a receptacle or port, therein forming an interconnect system. The interconnect system may comprise a mini input/output connector, data connector, power connector, fiber optic connector, or combination thereof. For example, the interconnect system may comprise a RJ-45 connector system. Non-limiting examples of interconnect systems and components are displayed in FIGS. 1, 2, 3, 4a, 4b, 5a, and 5b.

The gel may be used to create a seal formed by displacement. In other embodiments, the gel may be used to create a seal having radial functionality, axial functionality, or a combination thereof. In yet other embodiments, the gel may be used to create a seal formed by displacement and having radial and/or axial functionality.

Figure 2:
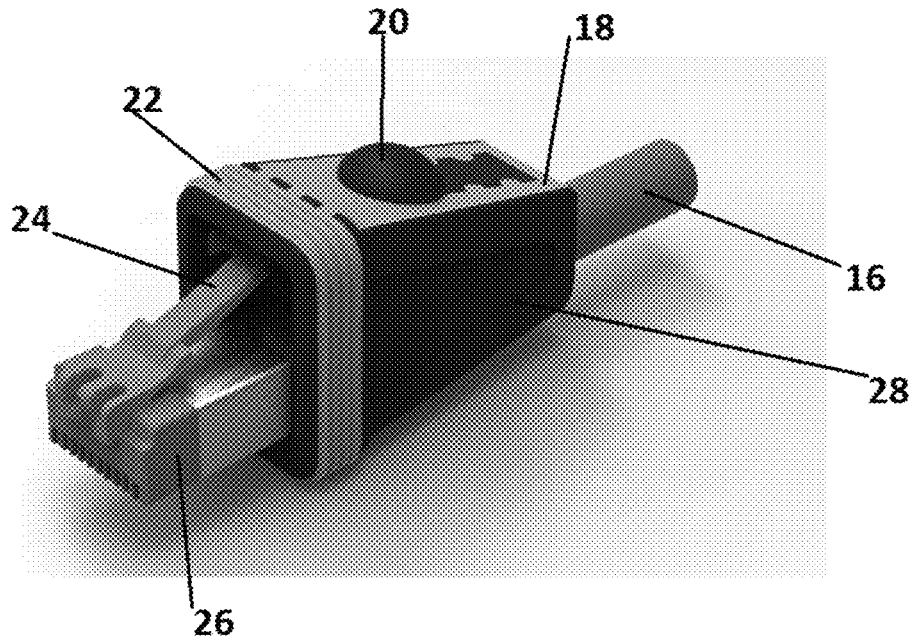
FIG. 2 is a depiction of a connector, housing, and cable assembly with radial sealing.
Figure 3:
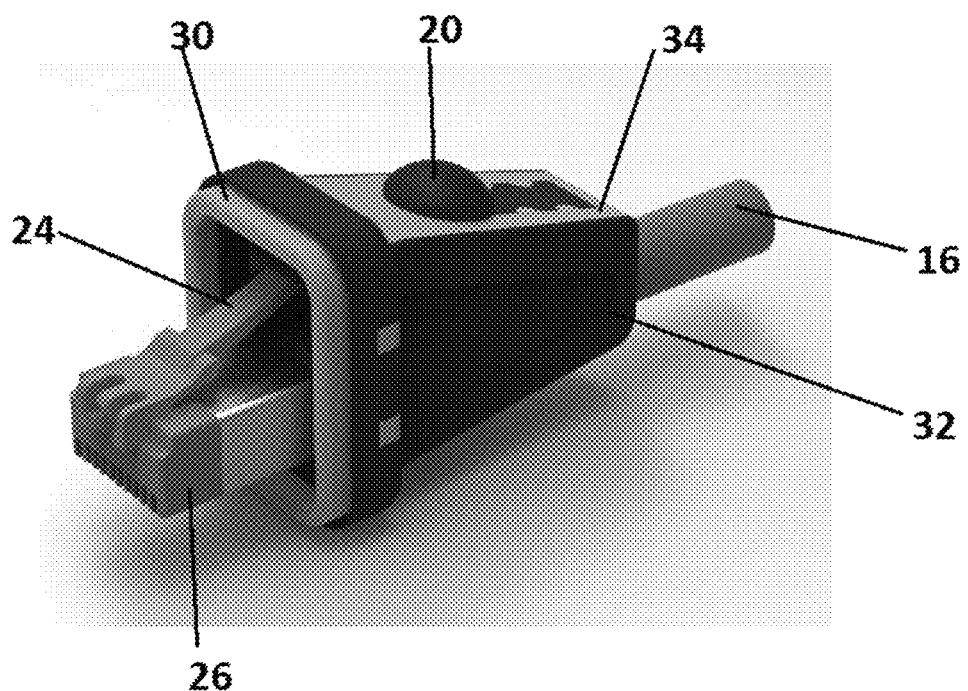
FIG. 3 is a depiction of a connector, housing, and cable assembly with axial sealing.

FIGS. 1, 2, and 3 provide non-limiting examples of radial and axial functionality. FIG. 1 displays an example of a connection hub having multiple connection receptacles or ports for the cables 16 within the housings 14 to be connected. FIG. 1 displays both radial connection ports 10 and axial connection ports 12. FIG. 2 displays a connector 26; housing 18, 28; and cable 16 assembly with radial sealing 22. FIG. 3 displays a connector 26; housing 32, 34; and cable 16 assembly with axial sealing 30, wherein the seal follows the surface of the axial port 12 (as shown in FIG. 1). In certain embodiments, the housing may have a knob 20 that may be pushed inward to engage the latch 24 on the connector 26, allowing the connector to be removed from the port.

Figure 4A:
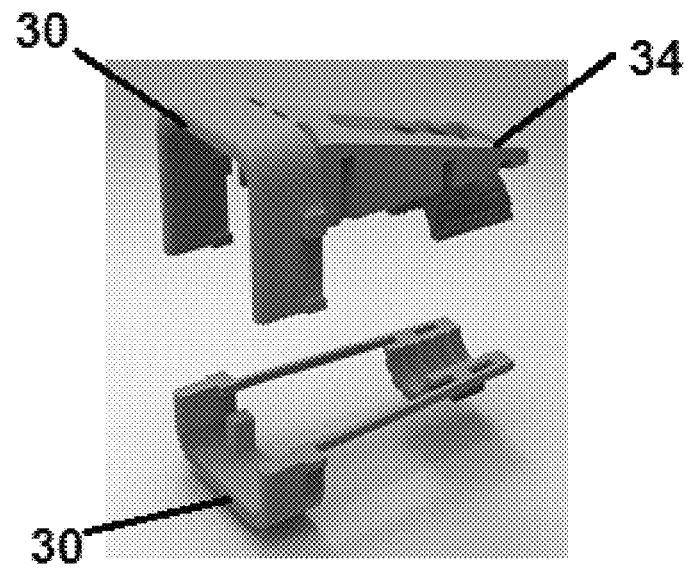
FIGS. 4a and 4b are depictions of a straight two piece housing assembly designed for axial sealing.
Figure 4B:
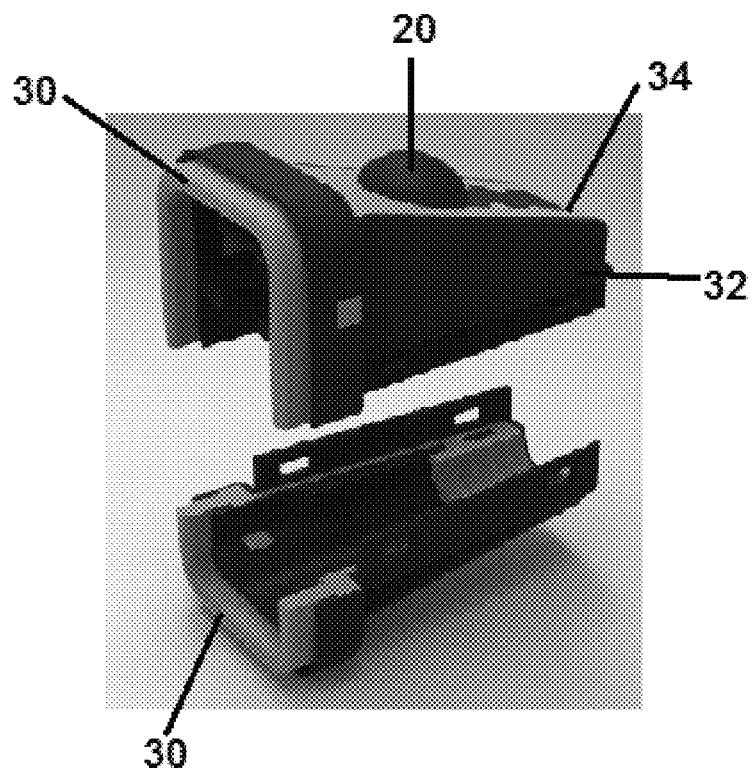

In certain embodiments, the gel may be used to create a seal in a housing assembly having multiple parts. For example, in one embodiment the gel may be used in a straight two-piece housing assembly, as shown in FIGS. 4a and 4b. Similar to FIG. 3, FIGS. 4a and 4b display a two-piece housing 32, 34, having axial sealing 30, wherein the seal follows the surface of the axial port 12 (as shown in FIG. 1). In certain embodiments, the housing may have a knob 20 that may be pushed inward to engage the latch 24 (as shown in FIG. 3) on the connector 26 (as shown in FIG. 3), allowing the connector to be removed from the port.

Figure 5A:
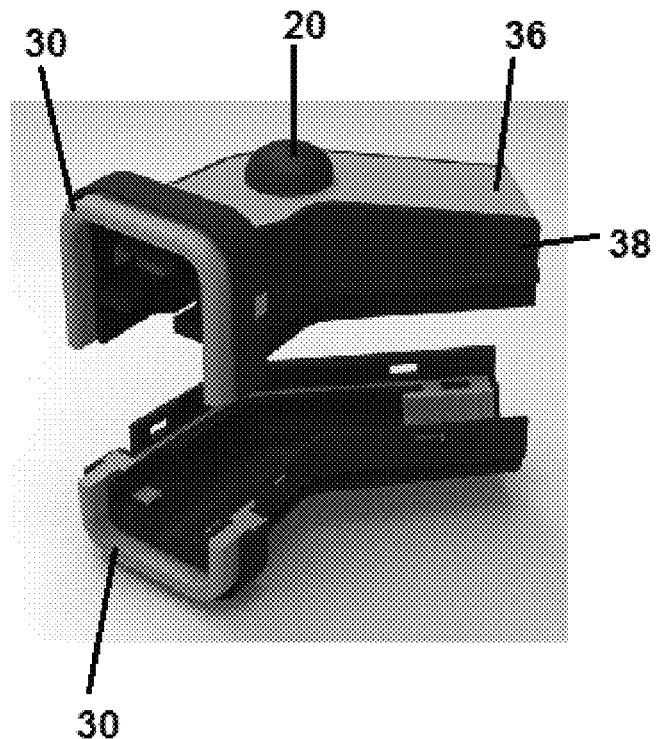
FIGS. 5a and 5b are depictions of an angled two piece housing assembly designed for axial sealing.
Figure 5B:
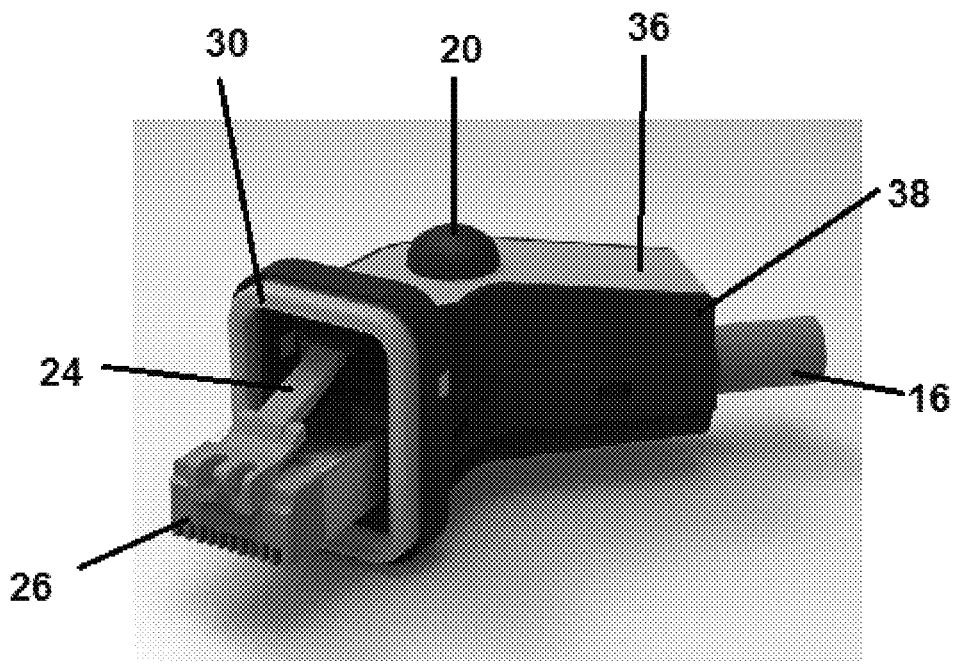

In another embodiment, the gel may be used in an angled two-piece housing assembly, as shown in FIGS. 5a and 5b. FIGS. 5a and 5b display a connector 26; angled two-piece housing 36, 38; and cable 16 assembly with axial sealing 30, wherein the seal follows the surface of the axial port 12 (as shown in FIG. 1). In certain embodiments, the housing may have a knob 20 that may be pushed inward to engage the latch 24 on the connector 26, allowing the connector to be removed from the port.

The gel may be sealed around the cable 16 by sliding a smaller diameter gel formation over the cable to create a seal through interference. In other embodiments, the seal may be created by molding the gel around the inside of the housing components and then snapping the housing, gel, and cable into place.

In some embodiments, the gel is used in a closure or interconnect system that is "compatible" with a low smoke zero halogen (LSZH) cable. In certain embodiments, compatibility is measured by subjecting the sample to one or more mechanical or environmental tests to test for certain functional requirements. In some embodiments, compatibility is measured by passing a pressure loss test, tightness test, and/or visual appearance test. In certain embodiments, the gel in the closure or interconnect system is compatible where a traditional thermoplastic elastomer gel would fail.

In certain embodiments, the gel is used as a sealant in a telecommunications enclosure. Non-limiting examples of telecommunications enclosures are shown in FIGS. 6-10.

Figure 6:
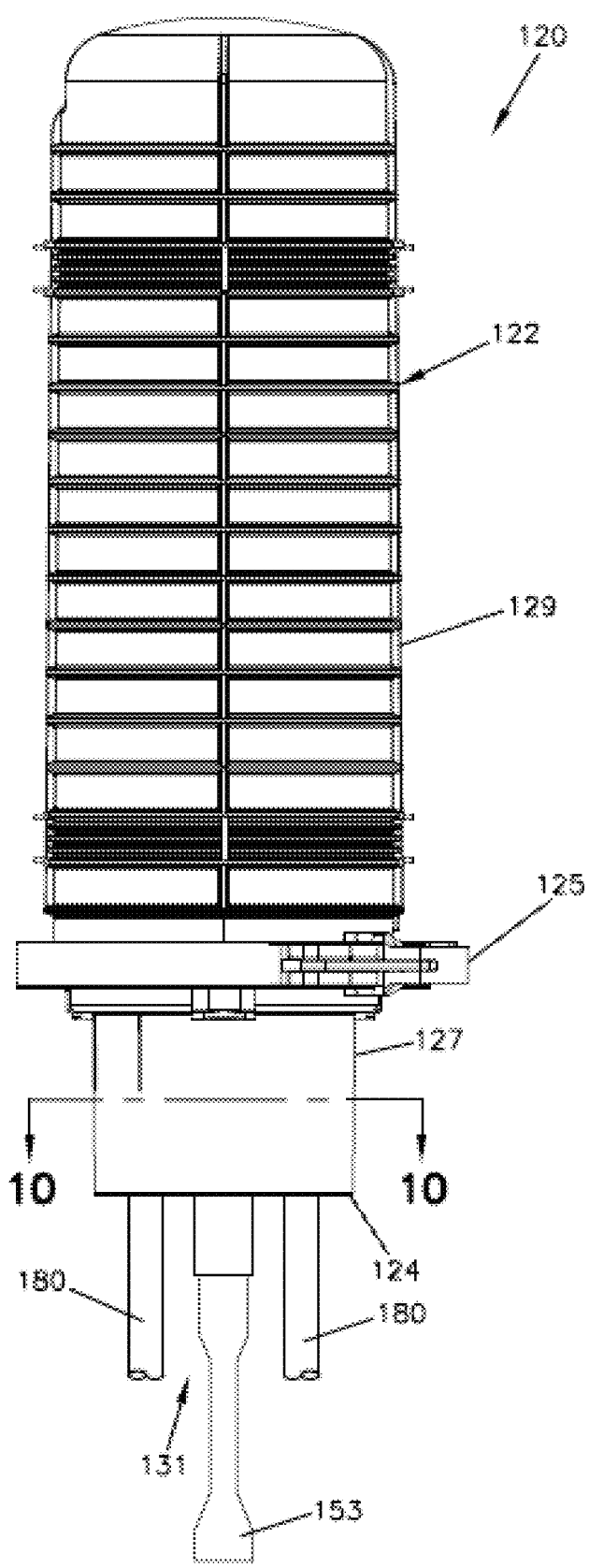
FIG. 6 is a side view of a telecommunications enclosure suitable for using a sealant in accordance with the principles of the present disclosure.
Figure 7:
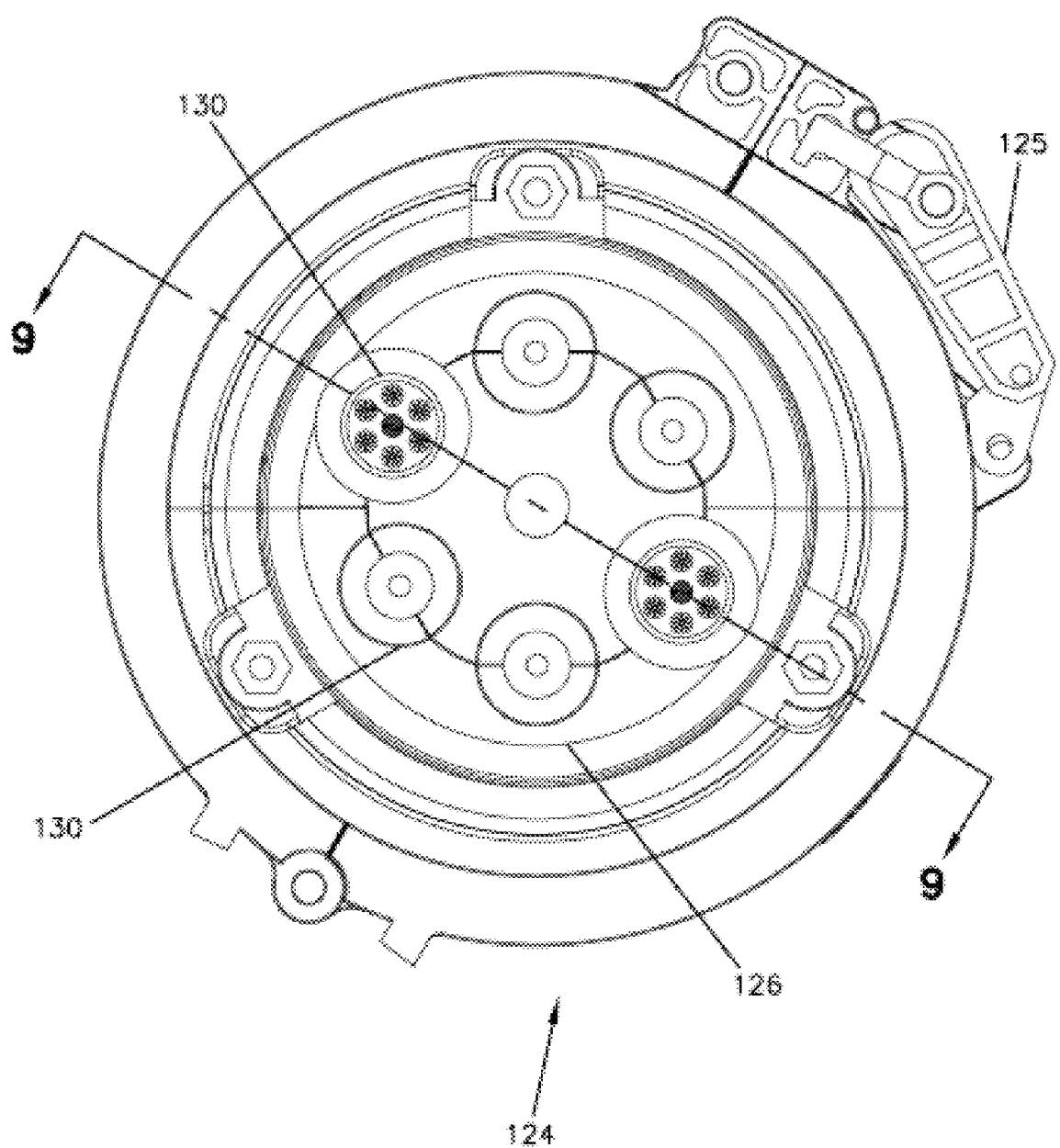
FIG. 7 is an end view of the telecommunications enclosure of FIG. 6.
Figure 8:
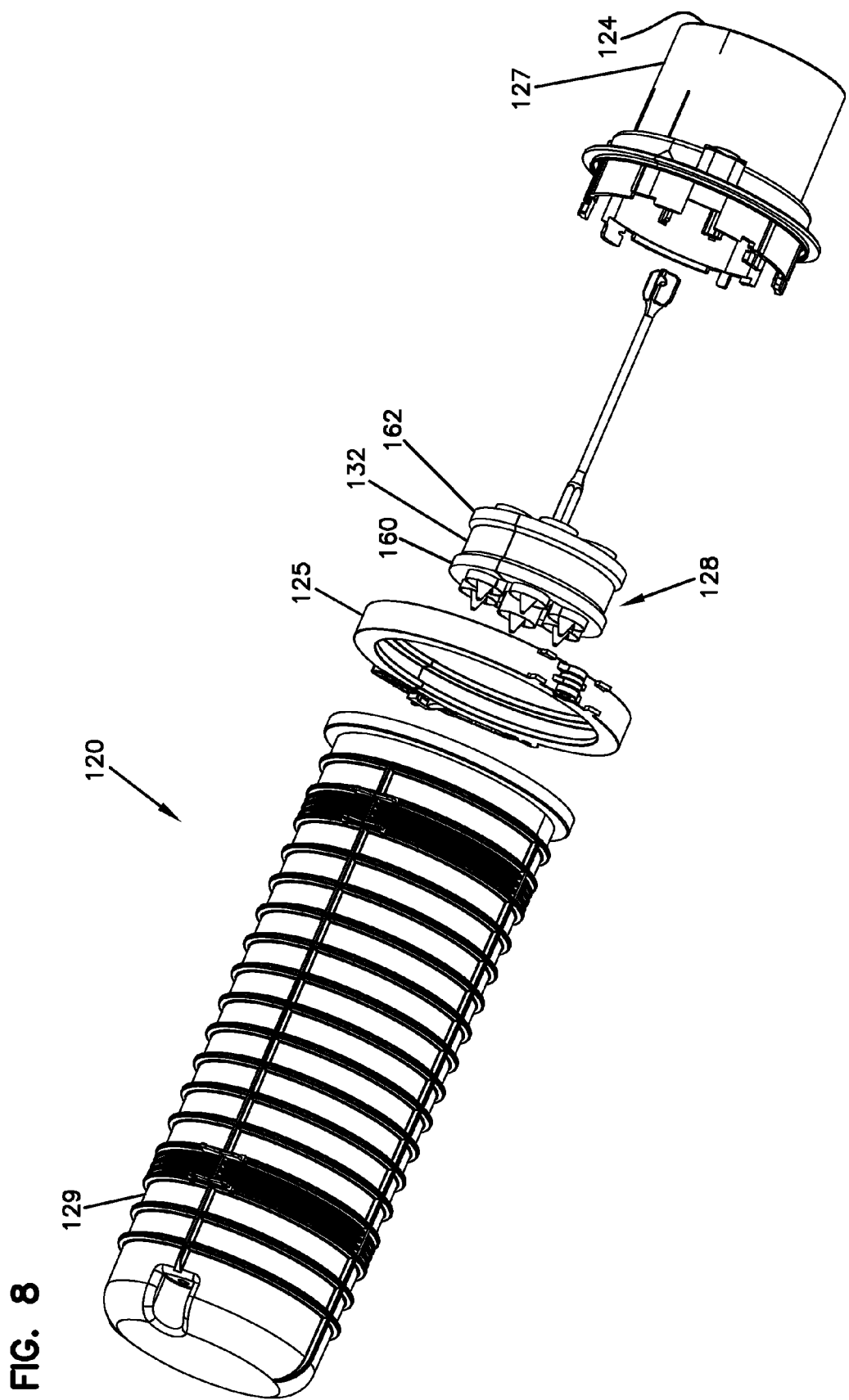
FIG. 8 is an exploded view of the telecommunications enclosure of FIG. 6.

FIGS. 6-8 show a telecommunications enclosure 120 suitable for using a sealing material in accordance with the principles of the present disclosure. The enclosure 120 includes a housing 122 having an end 124 defining a sealing unit opening 126. The sealing unit opening 126 is defined by a base 127 of the enclosure 120. The base 127 has a hollow sleeve-like configuration. A dome-style cover 129 is secured to the base 127 by a channel clamp 125. The enclosure 120 also includes a sealing unit 128 (see FIGS. 8-10) that fits within the sealing unit opening 126. The sealing unit 128 includes a sealant arrangement 132 (see FIGS. 9 and 10) defining a plurality of cable ports 130. The sealant arrangement can include a material having stress-strain characteristics in accordance with the principles of the present disclosure. In certain embodiments, the sealant arrangement can include a hybrid gel of the type disclosed herein. When pressurized, the sealant arrangement 132 is configured for providing seals about structures (e.g., cables, plugs, etc.) routed though the cable ports 130 and is also configured for providing a peripheral seal with the housing 122. The enclosure 120 further includes an actuation arrangement 131 (see FIG. 9) for pressurizing the sealant arrangement 132 within the sealing unit opening 126. In other embodiments, the housing can be an enclosure (e.g., an aerial enclosure) having a pass-through configuration with sealing units located at opposite ends of the enclosure. In certain embodiments, a frame supporting optical components (e.g., optical splices, optical splitters, optical splice trays, optical splitter trays, fiber management trays, passive optical splitters, wavelength division multi-plexers, etc.) can be mounted within the enclosure 120.

Figure 9:
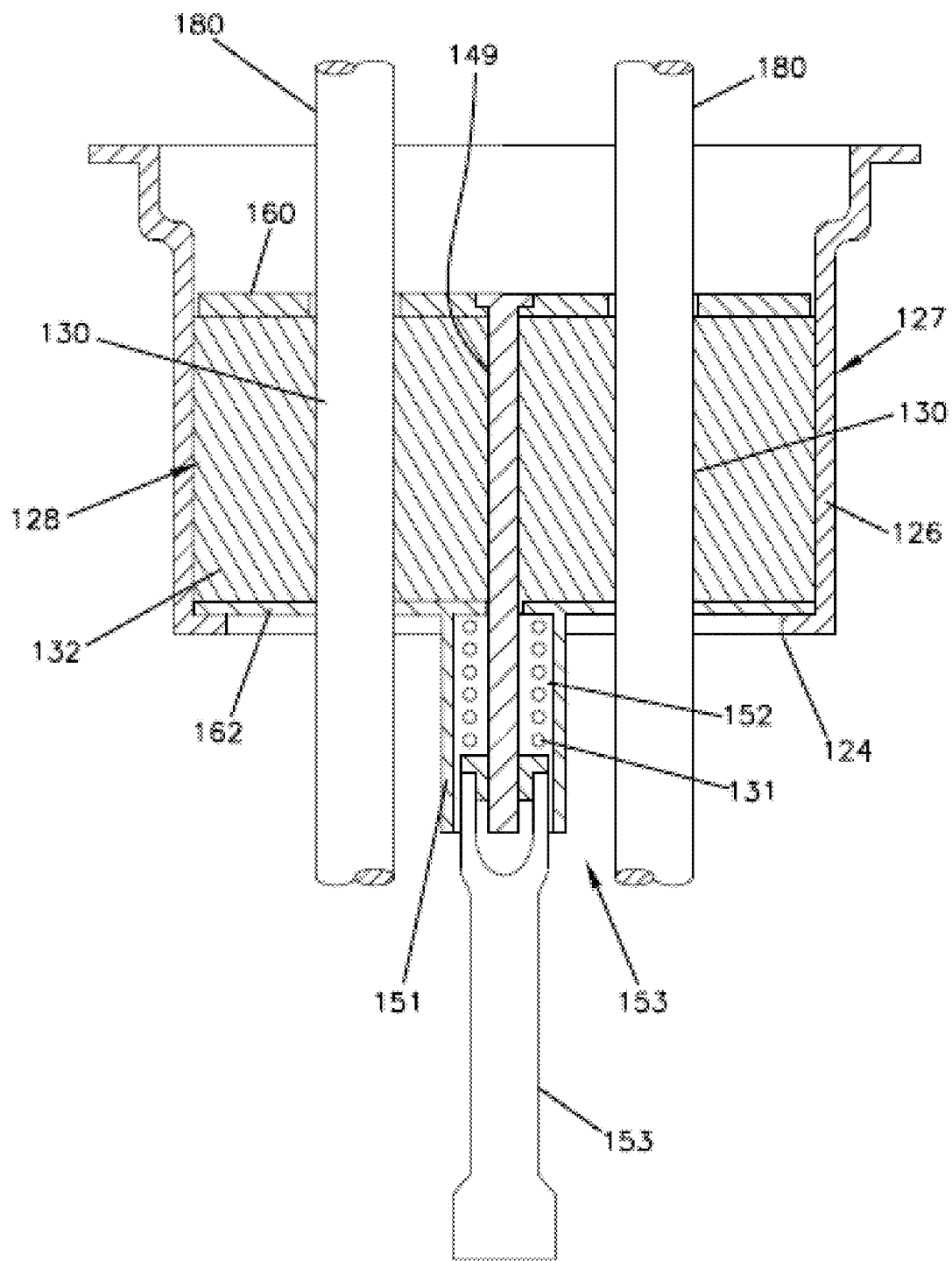
FIG. 9 is a cross-sectional view taken along section line 9-9 of FIG. 7.

Referring to FIG. 9, the actuation arrangement 131 includes inner and outer pressurization structures 160, 162 (e.g., plates, members, bodies, etc.). The sealant arrangement 132 is positioned between the inner and outer pressurization structures 160, 162. The actuation arrangement 131 also includes a threaded shaft 149 that extends between the inner and outer pressurization structures 160, 162 and a nut 151 that is threaded on the threaded shaft 149. The actuation arrangement further includes a spring 152 for transferring a seal pressurization force to the sealant arrangement 132. The spring 152 is captured between the nut 151 and the outer pressurization structure 162. An extension 153 (e.g., a wrench or other tool) is used to turn the nut 151 a first rotational direction (e.g., clockwise) on the threaded shaft 149 causing the spring 152 to be compressed between the nut 151 and the outer pressurization structure. As the spring 152 is compressed, the threaded shaft 149 is tensioned and the inner and outer pressurization structures 160, 162 are drawn together. As the inner and outer pressurizations structures 160, 162 are drawn together, the sealant arrangement 132 is pressurized between the pressurization structures 160, 162 causing the sealant arrangement 132 to flow/deform to fill voids within the sealing unit opening 126, to form the peripheral seal with the housing 122, and to form seals around any cables or inserts positioned within cable ports 130. Thus, when the actuation arrangement 131 is actuated, the first and second pressurization plates 60, 62 are spring biased toward one another such that spring pressure is applied through the sealant arrangement 132 for pressurizing the sealant arrangement 132 to maintain effective sealing over an extended period of time. In other embodiments, different actuation configurations can be used. The sealant arrangement 132 can be depressurized by turning the nut 151 a second rotational direction (e.g., counterclockwise) on the shaft 149 to decompress the spring 152.

Figure 10:
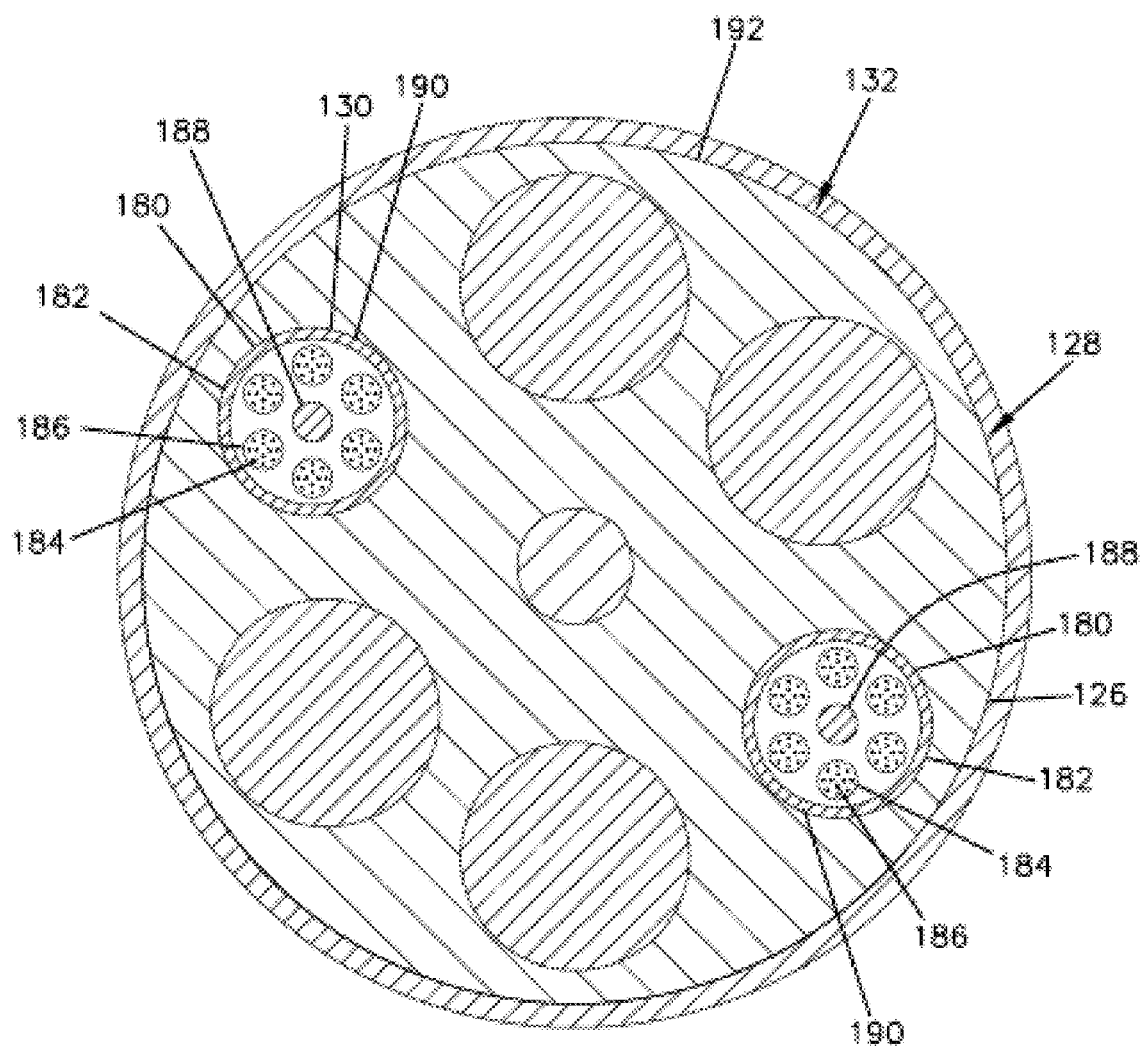
FIG. 10 is a cross-sectional view taken along section line 10-10 of FIG. 6.

Referring to FIGS. 9 and 10, two cables 180 are shown passing through the cable ports 130 while the remainder of the cable ports 130 are shown blocked with plugs. The cables 180 include outer jackets 182 containing a plurality of buffer tubes 184. A plurality of optical fibers 186 are contained in each of the buffer tubes 184. The cables 180 also include center strength members 188 (e.g., fiberglass reinforced epoxy rods) that provide the cables with tensile and compressive reinforcement. In other embodiments, reinforcing members in the form aramid yarns or other reinforcing structures can be used. In certain embodiments, the cables 180 can be LSZH cables and the outer jackets include EVA. When pressurized, the sealant arrangement 132 contacts the outer jackets 182 and forms cable seals 190 around peripheries of the cable jackets 182. When pressurized, the sealant arrangement 132 also contacts an interior of the base 127 to form a peripheral seal 192 with the base 127. Cables having alternative constructions (e.g., flat drop cables, cables without buffer tubes, cables without center strength members, etc.) can also be used.

The sealant of the sealant arrangement 132 can be designed with custom stress-strain profile suitable for a given application. In certain embodiments, the stress-strain profile includes a first stress-strain slope corresponding to an initial elongation range and a second stress-strain slope corresponding to a subsequent elongation range. In certain embodiments, a transition area or slope exists between the first stress-strain slope and the second stress-strain slope.

In certain embodiments, the initial elongation range is from 0 to at least 200 percent elongation, or from 0 to at least 400 percent elongation, or from 0 to at least 600 percent elongation. In other embodiments, the initial elongation range exists at less than 600 percent elongation, or at less than 400 percent elongation, or at less than 200 percent elongation. The subsequent elongation range preferably starts at or after the end of the initial elongation range. The second stress-strain slope preferably is steeper than the first stress strain slope. In certain embodiments, the second stress-strain slope is at least 10 percent steeper than the first stress-strain slope (i.e., the second stress-strain slope is at least 1.1 times as steep as the first stress-strain slope). In other embodiments, the second stress-strain slope is at least 25 percent steeper than the first stress-strain slope (i.e., the second stress-strain slope is at least 1.25 times as steep as the first stress-strain slope). In still other embodiments, the second stress-strain slope is at least 50 percent steeper than the first stress-strain slope (i.e., the second stress-strain slope is at least 1.5 times as steep as the first stress-strain slope). In additional embodiments, the second stress-strain slope is at least 100 percent steeper than the first stress-strain slope (i.e., the second stress-strain slope is at least 2 times as steep as the first stress-strain slope). The first stress-strain slope can be suitable for allowing the sealant arrangement to deform and flow to effectively fill voids within the opening 126 of the base 127. The second stress-strain slope profile can be suitable for inhibiting the sealant arrangement 132 from escaping containment between the inner and outer pressurization structures 160, 162 when fully pressurized.

The stress-strain properties of the gel may be tested by forming a round ring sample cut from a 3 mm thick sheet of gel using a defect free steel die set. The inside diameter of the ring is approximately 18 mm and the outside diameter is 27 mm. Mechanical property tests are performed using a universal test machine (Instron type) at a strain rate of 500 mm/min. The ring is placed in the test machine by slipping it over cylindrical pins 7 mm in diameter separated by a distance of 33 mm. One of the cylindrical pins is held in a stationary fixture while the other pin is held in a fixture attached to a load cell. The sample is oriented between the two pins such that it is directly under the load cell and is subject solely to a uniaxial tensile force (i.e., no side loading). The ring sample is then pulled at 500 mm/min until failure.

Tightness may be tested under International Electrotechnical Commission (IEC) Test 61300-2-38, Method A and IEC 60068-2-17, Test Qc. In certain embodiments, tightness is tested by immersing the specimen in a water bath and using an internal pressure of 20-40 kPa (0.2-0.4 atm) for 15 minutes. It is important that tightness is measured directly after installing the closure at a temperature of −15° C. or 45° C. It is also important that all the air bubbles present on the outside of the closure are removed. If a continuous stream of air bubbles is observed, this means the specimen is not properly sealed and it will be considered as a failure (i.e., not compatible).

Pressure loss may be tested under IEC 61300-2-38, Method B. In certain embodiments, the gel and cable are compatible if the difference in pressure before and after the test is less than 2 kPa (0.02 atm).

Visual appearance may be tested under IEC 61330-3-1 by examination of the product with the naked eye for defects that could adversely affect the product performance.

The sample may be subjected to various mechanical and/or environmental conditions prior to testing tightness, pressure loss, visual appearance, etc. In certain embodiments, compatibility is determined by subjecting the sample to one or more of the following mechanical tests: axial tension test, flexure test, re-entry test, and torsion test, and/or one or more environmental tests: resistance to aggressive media test, resistance to stress cracking test, salt fog test, temperature cycling test, and waterhead test.

In certain embodiments, the sample is subjected to an axial tension test according to IEC 61300-2-4. In this test, the sample may be pressured internally at 20 kPa (0.2 atm) or 40 kPa (0.4 atm) at room temperature and sealed. The base assembly is clamped and a force is applied to each of the extending cables individually. If the sample has an outer diameter of less than or equal to 7 mm, then the amount of force per cable applied is equal to (outer diameter/45 mm)*500 Newtons ("N"). This force is applied for 15 minutes for each cable and built up to the IEC 61300-2-4 test. If the sample has an outer diameter of greater than 7 mm, then the amount of force per cable applied is equal to (outer diameter/45 mm)*1000 N, with a maximum of 1000 N applied. This force is applied for one hour. Internal pressure is then examined for pressure loss. In certain embodiments, the gel and cable are compatible if the pressure loss is less than 2 kPa (0.02 atm). In addition, in certain embodiments, the gel and cable are compatible if the displacement of the cable is less than 3 mm. In other embodiments, the specimens are further subjected to the tightness test, previously described.

In other embodiments, compatibility is measured by subjecting the sample to a flexure test according to IEC 61300-2-37. In this test, the samples are subjected to temperatures of −15° C. and 45° C. Samples are pressured internally at 20 kPa or 40 kPa (0.2 atm or 0.4 atm) and sealed. Cables are bent individually at an angle of 30° (or a maximum force application of 500 N) each side of neutral in the same plane. Each bending operation is held for 5 minutes. The cable is returned to its original position and then the procedure is repeated in the opposite direction. After 5 cycles on each cable, the samples are visually inspected by the naked eye for appearance, conditioned at room temperature, and subjected to a tightness test. In some embodiments, the gel and LSZH cable are compatible if the specimen passes the visual appearance test, pressure loss test (i.e., less than 2 kPa (0.02 atm)), and/or tightness test.

In another embodiment, compatibility is measured by subjecting the sample to a re-entry test according to IEC 61300-2-33. In certain embodiments, re-entry can be simulated after a certain time of temperature cycling. To complete this test, the closure has to be removed from the cycling room and tested on tightness. After this a reentry test can be done. In this test, a dummy plug or cable is removed from the closure and another cable or dummy plug is added. Then, tightness is measured again. Re-entry is successful if the closure passes the tightness test again.

Another mechanical test may be employed to determine compatibility. The sample may be subjected to a torsion test according to IEC 61300-2-5. After completion of the torsion test, the gel and cable may be considered compatible if the sample passes the visual inspection test, pressure loss test, and/or tightness test.

In yet other embodiments, compatibility is measured by conducting an environmental test of temperature cycling or accelerated aging under IEC 61300-2-22 and IEC 60068-2-14, Test Nb. In one embodiment, the temperature cycling test is conducted on the cable jacket between the gel blocks by cycling the temperature between −40° C. and 70° C. for 10 days at two cycles between the extreme temperatures per day. In some embodiments, the humidity is uncontrolled, the dwell time is four hours and the transition time is two hours. In certain embodiments, the cable jacket is tested for maintenance of tensile strength, ultimate elongation, tightness, visual appearance, and/or re-entry. Also, in certain embodiments, after the temperature cycling test, tightness of the closures needs to be tested after being conditioned to room temperature for a minimum of 2 hours. Therefore, in certain embodiments, the gel and LSZH cable are compatible if the specimen passes the tightness test.

In another embodiment, compatibility is determined by subjecting the sample to a resistance to aggressive media test under IEC 61300-2-34, ISO 1998/I, and EN 590. The sample is considered compatible if it subsequently passes the tightness and/or appearance test.

In yet another embodiment, compatibility is determined by subjecting the sample to a resistance to stress cracking test under IEC 61300-2-34. The sample is considered compatible if it subsequently passes the tightness test and/or shows no visible signs of cracking.

In other embodiments, compatibility is determined by subjecting the sample to a salt fog test under IEC 61300-2-36 and IEC 60068-2-11, Test Ka. The sample is considered compatible if it subsequently passes the tightness and/or appearance test.

In some embodiments, compatibility is determined by subjecting the sample to a waterhead test under IEC 61300-2-23, Method 2. The sample is considered compatible if there is no water ingress.

In certain embodiments, the gel has measurable properties. For example, in some embodiments, the gel has a hardness in the range of 24 to 53 Shore 000 Hardness, or 80 to 300 g, as measured according to methods known in the art. In certain embodiments, the shore hardness gauge is measured according to ISO868 or ASTM D2240. In other embodiments, hardness can be measured on a texture analyzer. For example, a LFRA Texture Analyzer-Brookfield may include a probe assembly fixed to a motor driven, bi-directional load cell. In such a system, the probe is driven vertically into the sample at a pre-set speed and to a pre-set depth. The hardness is the amount of force needed to push the probe into the test sample. In other embodiments, the gel has a hardness in the range of 37 to 45 Shore 000, or 160 to 220 g. In yet other embodiments, the gel has a hardness in the range of 38 to 42 Shore 000, or 170 to 200 g.

For further example, the gel may have certain properties after being subjected to compression set testing. A modified version of ASTM D395, method B provides one method of compression set testing to determine the ability of elastomeric materials to maintain elastic properties after prolonged compressive stress. The test measures the somewhat permanent deformation of the specimen after it has been exposed to compressive stress for a set time period. Under compression testing, the thickness of the original specimen is measured and then the specimen is then placed between spacers and in a compression device. The specimen may be compressed to 25% or 50% of its original height, using spacers to accurately measure the compression. Within two hours of assembly, the compression device is placed in an oven at a specified temperature for an extended periods of time. After removing the sample from the oven, the specimen is allowed to cool (e.g., for 30 minutes) before measuring the final thickness. In certain embodiment, the compression set of the gel sample, as measured after 50% strain has been applied for 1000 hours at 70° C., has a range between 4% and 20%. In other embodiments, the compression set, as measured after 50% strain has been applied for 1000 hours at 70° C., has a range between 10% and 14% when measured according to the modified version of ASTM D395, method B described above.

In some embodiments, the gel is compressed with a certain strain or deformation (e.g., in certain embodiments, to 50% of its original size). This causes a certain stress in the material. The stress is now reduced because the material relaxes. In certain embodiments, the stress relaxation of the gel has a possible range between 20 and 65% when subjected to a tensile strain or deformation of about 50% of the gel's original size, wherein the stress relaxation is measured after a one minute hold time at 50% strain. In other embodiments, the stress relaxation of the gel is between 30% and 50% when subjected to a tensile strain of about 50%. A higher stress relaxation indicates that once a gel is installed in a closure, the gel will require less stress in order for it to seal.

In certain embodiments, the gel composition has less than 10% bleed out over a period of time when the gel is under compression of 50 kPa (0.5 atm) or 120 kPa (1.2 atm) at 60° C. The weight of the gel sample is recorded before and after the pressure has been applied. In certain embodiments, extender bleed out is measured on a wire mesh, wherein the oil loss may exit the gel through the mesh. Typically, gel samples should be 3 mm±0.5 mm thick and have a diameter of 14 mm±0.5 mm, and three samples should be tested from each gel. The gel sample is placed into a cylindrical hole/tube resting on a fine and rough screen, which gives enough support to hold the gel but in the meantime allows the oil to separate from the gel. Pressure is applied to the gel by placing a weight on top of a piston (which prevents the gel from creeping out of the hole. Typically, approximately 50 kPa (0.5 atm) or 120 kPa (1.2 atm) of pressure is placed on the gel sample. Then, the sample is placed in an oven at 60° C. After 24 hours, the sample is removed from the oven to clean the surface oil and weigh the gel. The sample is then returned to the oven. Weight measurements are taken every 24 hours until stabilization has occurred (e.g., when 5 weight measurements are constant).

In some embodiments, the gel has less than 8%, 6%, 4%, or 2% extender bleed out over the period of time. In certain embodiments, the oil loss is measured at 200 hours, 400 hours, 600 hours, 800 hours, 1000 hours, 1200 hours, or 1440 hours (60 days).

In certain embodiments, the gel has less extender bleed out in comparison to a thermoplastic gel over the same period of time at 50 kPa (0.5 atm) or 120 kPa (1.2 atm) at 60° C. In some embodiments, the gel has less than 20%, 30%, 40%, 50%, or 60% of the extender bleed out of a similar, traditional thermoplastic gel at 200 hours, 400 hours, 600 hours, 800 hours, 1000 hours, 1200 hours, 1440 hours (60 days), 2000 hours, or 3000 hours.

EXAMPLES

Example 1

A thermoplastic gel was made using the following formula:

| Component | Weight |
| --- | --- |
| RTV 633 | 330 g |
| Kraton D1119P | 285 g |

A gel like material was obtained by combining Kraton D1119P (Kraton Polymers), RTV 633 (Momentive Performance Materials). Kraton D1119P is a styrene-isoprene-stryene block copolymer. RTV 633 is a 80,000 cSt divinyl terminated polydimethyl siloxane. One example composition was made according to the following procedure. A lab scale batch dispersion mixer (Moriyama) was adjusted to 180° C. 330 g of RTV 633 were added to the mixer. The vinyl silicone was allowed to heat to approximately 170° C., and then 285 g of Kraton D1119P were added to the mixer. Once the Kraton was fully melted and blended with the vinyl silicone (which took about 30-45 minutes), the mixture was removed from the mixer and allowed to cool.

This mixture can be injected into a development low pressure molding system at about 193° C. (380° F.) to form any of the gel blocks for a fiber optic splice closure system (e.g., Tyco Electronics FOSC 250). The mixture also exhibited sufficient as molded strength to remove from the molds intact. As observed, the mixture was gel like but had a significant amount of tack due to the unreacted vinyl terminated PDMS.

Example 2

A thermoplastic gel was made using the following formula:

| Component | Weight |
| --- | --- |
| RTV 633 | 200 g |
| Kraton D1119P | 150 g |
| Dicumyl peroxide (Di-Cup) | 0.5 g |

A gel like material was obtained by combining Kraton D1119P, RTV 633 and dicumyl peroxide ("Di-Cup") (from Arkema). One example composition was made according to the following procedure. The jacket hot oil heater to a laboratory two blade planetary (Ross LDM) 1 quart mixer to was adjusted to 180° C. 150 g of RTV 633 was added to the mixer. The vinyl silicone was allowed to heat to approximately 170° C., and then 150 g of Kraton D1119P was added. Once the Kraton was fully melted and blended with the vinyl silicone (which took about 30-45 minutes), 50 g of additional vinyl silicone was added. Once the mixture reaches a temperature of approximately 170° C., 0.5 g dicumyl peroxide was added carefully. The Di-Cup was added slowly while the planetary blades were still turning to allow the mixture to be thoroughly blended. After mixing for 5-10 minutes, a majority of the chemical reaction was complete. The viscous, somewhat elastic mixture was then dispensed into a heat resistant container. Other compositions were made with various proportions of RTV 633, Kraton, and Di Cup.

The material made using the above procedure was gel like and somewhat elastic, but exhibited no evidence of bleed out of low molecular weight materials under atmospheric pressure. As observed using an optical microscope, the mixture appeared to be a compatibilized and blended mixture of silicone rich and Kraton rich polymeric fibrous regions. The mixture was able to be melted into a smooth uniform plaque of approximately 10 mm thick (or other thicknesses depending on the mold used) by using a hot press with both platens set at 170° C. The mixture was injected into a fiber optic splice closure system (e.g., Tyco Electronics FOSC 250) using a modified heated cylinder and gear pump. The mixture packed well into the FOSC 250 center base mold and had some adhesion to the polypropylene insert. The mixture did not shrink excessively in the mold and did not adhere to the aluminum section of the mold. The injection temperature at the tip of the mold was approximately 204° C. (400° F.) and the pressure at the tip was almost 70 atm (1000 psi).

Comparative Examples 1-2

As part of this series of investigations, two other compositions of matter were made. In one investigation, Di-Cup was mixed with divinyl silicone in a similar proportion as above. The resulting mixture was tough and rubbery, but not melt processable. When the quantity of Di-Cup was reduced, the resulting mixture was viscous and tacky but not at all elastic and over time, flowed to take the shape of its container.

In another investigation, Di-Cup was reacted with SIS Kraton without a Si-vinyl polymer. The resulting mixture was very similar to the starting material (Kraton) but slightly more tacky, indicating all that had happened was that the molecular weight of the polymer had decreased or the molecular weight distribution had become more broad.

These results were taken as empirical evidence that the combination of styrenic block copolymer (e.g., Kraton) with a Si-vinyl polymer (e.g., RTV 633), and an initiator (e.g., Di Cup) resulted in grafting of the styrenic block copolymer molecules onto the Si-vinyl polymer. According to the Kraton literature, SIS block copolymers degrade with free radicals by chain scission at the midblock (isoprene).

Additional Comparative Examples

A variety of other mixtures were made as well. These included: (1) attempting to use platinum catalyzed hydrosilation reactions and chain extension on a SBS Kraton block copolymer, (2) using silane chemistry to graft onto the styrenic block copolymer (Kraton), and (3) attempting to use a peroxide to graft vinyl silicone onto hydrogenated Kraton SBS block copolymers. The use of the Di-Cup peroxide to graft onto hydrogenated SBS was not successful. The other mixtures were interesting but not as gel like or promising as the mixture described in Example 2. Most showed clear evidence of bleed out of unreacted or low molecular weight Si-vinyl polymer.

The gels may be tested in a number of ways, such as temperature cycling, re-entry test, sealing under water pressure, cold and hot installations, and kerosene exposure. For temperature cycling experiments, closures including the gels are exposed to temperatures between −30° C. and +60° C. for 10 days. Humidity is typically not controlled. The closures are cycled between the high and low temperatures two times a day for ten days. Samples are maintained at the extreme temperatures for four hours during each cycle.

For combined temperature cycling tests, the gels are installed in three closure systems. After installation, the closures are tested on tightness and put into temperature cycling. After eight days, a re-entry test is performed, and after ten days, the closures are taken out of cycling and tested on tightness and re-entry. Closures containing the traditional thermoplastic gels are also tested.

For tightness testing, the closure is immersed in a water bath for 15 minutes and an internal pressure of 20 kPa. If air bubbles are observed, this means the closure is not properly sealed and it will be considered as a failure.

For re-entry testing, a dummy plug or cable is removed from the closure and another cable or dummy plug is added. Then, tightness is measured again. Re-entry is successful if the closure passes the tightness test again.

In certain embodiments, the gel in the closure system may be able to pass the tightness and re-entry tests where a traditional thermoplastic elastomer gel would fail.

Although examples have been described herein, it should be appreciated that any subsequent arrangement designed to achieve the same or similar purpose may be substituted for the specific examples shown. This disclosure is intended to cover any and all subsequent adaptations or variations of various examples. Combinations of the above examples, and other examples not specifically described herein, may be apparent to those of skill in the art upon reviewing the description.

The Abstract is provided with the understanding that it will not be used to interpret or limit the scope or meaning of the claims. In addition, in the foregoing Detailed Description, various features may be grouped together or described in a single example for the purpose of streamlining the disclosure. This disclosure is not to be interpreted as reflecting an intention that the claimed examples require more features than are expressly recited in each claim. Rather, as the following claims reflect, inventive subject matter may be directed to less than all of the features of any of the disclosed examples. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other examples, which fall within the true spirit and scope of the description. Thus, to the maximum extent allowed by law, the scope is to be determined by the broadest permissible interpretation of the following claims and their equivalents, and shall not be restricted or limited by the foregoing detailed description.

What is claimed is:

1. A method of making a hybrid thermoplastic gel comprising:
   providing a styrenic block copolymer;
   providing a Si-vinyl polymer;
   providing heat; and
   reacting the styrenic block copolymer and Si-vinyl polymer in the presence of the heat to form a hybrid thermoplastic gel.

2. The method of claim 1, further comprising providing an initiator to facilitate the reacting of the styrenic block copolymer and the Si-vinyl polymer.

3. The method of claim 2, wherein the initiator is selected from the group consisting of: peroxides, azobisisobutyronitrile, addition cure compositions, condensation cure compositions, and combinations thereof.

4. The method of claim 2, wherein the initiator is a peroxide.

5. The method of claim 4, wherein the peroxide is dicumyl peroxide.

6. The method of claim 1, further comprising providing at least one additive selected from the group consisting of: flame retardants, coloring agents, adhesion promoters, antioxidants, synergistic antioxidant antiozonant mixtures, stabilizers, clays or other reinforcing particulate fillers, dispersants, flow improvers, rubber particles, silanes, acid scavengers, plasticizers, slip agents, toughening agents, and combinations thereof.

7. The method of claim 1, wherein the styrenic block copolymer is a copolymer selected from the group consisting of: styrene-isoprene-styrene, styrene-ethylene/butylene-styrene, styrene-ethylene/propylene-styrene, or styrene butadiene styrene.

8. The method of claim 1, wherein the styrenic block copolymer is a styrene-isoprene-styrene copolymer.

9. The method of claim 1, wherein the Si-vinyl polymer is vinyl terminated polydimethylsiloxane.

10. The method of claim 1, wherein the gel comprises one or more of the following properties:
    a) a hardness between 80 g and 300 g;
    b) a stress relaxation between 20% and 65% when the gel is subjected to a deformation of 50% of its original size;
    c) a compression set between 4% and 20% after 50% strain has applied to the gel for 1000 hours at 70° C.; and
    d) less than 10% extender bleed out after being under compression of 1.2 atm for 60 days at 60° C.

11. A hybrid thermoplastic gel prepared by mixing a gel composition in the presence of heat, wherein the gel composition comprises:
    5-70 wt. % of a styrenic block copolymer;
    30-95 wt. % of a Si-vinyl polymer; and
    0-10 wt. % of an initiator.

12. The gel of claim 11, wherein the gel composition comprises:
    20-55 wt. % of a styrenic block copolymer;
    45-80 wt. % of a Si-vinyl polymer; and
    0.01-5 wt. % of an initiator.

13. The gel of claim 11, wherein the gel composition comprises:
    35-50 wt. % of a styrenic block copolymer;
    50-65 wt. % of a Si-vinyl polymer; and
    0.1-3 wt. % of an initiator.

14. The gel of claim 11, wherein the gel composition comprises 0.01-10 wt. % of the initiator, and the initiator is selected from the group consisting of:
    peroxides, azobisisobutyronitrile, addition cure compositions, condensation cure compositions, and combinations thereof.

15. The gel of claim 14, wherein the initiator is a peroxide.

16. The gel of claim 15, wherein the peroxide is dicumyl peroxide.

17. The gel of claim 11, wherein the gel composition further comprises at least one additive selected from the group consisting of: flame retardants, coloring agents, adhesion promoters, antioxidants, synergistic antioxidant antiozonant mixtures, stabilizers, clays or other reinforcing particulant fillers, dispersants, flow improvers, rubber particles, silanes, acid scavengers, plasticizers, slip agents, toughening agents, and combinations thereof.

18. The gel of claim 11, wherein the styrenic block copolymer is a copolymer selected from the group consisting of: styrene-isoprene-styrene, styrene-ethylene/butylene-styrene, styrene-ethylene/propylene-styrene, or styrene butadiene styrene.

19. The gel of claim 11, wherein the styrenic block copolymer is a styrene-isoprene-styrene copolymer.

20. The gel of claim 11, wherein the Si-vinyl polymer is vinyl terminated polydimethylsiloxane.

21. The gel of claim 11, wherein the gel comprises one or more of the following properties:
   a) a hardness between 80 g and 300 g;
   b) a stress relaxation between 20% and 65% when the gel is subjected to a deformation of 50% of its original size;
   c) a compression set between 4% and 20% after 50% strain has applied to the gel for 1000 hours at 70° C.; and
   d) less than 10% extender bleed out after being under compression of 1.2 atm for 60 days at 60° C.

* * * * *